(12) United States Patent
Hiruma et al.

(10) Patent No.: US 8,380,746 B2
(45) Date of Patent: Feb. 19, 2013

(54) DATABASE SYSTEM, TERMINAL APPARATUS, AND METHOD OF GENERATING DISPLAY IMAGE

(75) Inventors: Akio Hiruma, Shizuoka-ken (JP); Masao Hiruma, legal representative, Shizuoka (JP); Kenji Shimizu, Shizuoka-ken (JP); Masanori Sambe, Shizuoka-ken (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 144 days.

(21) Appl. No.: 12/959,801

(22) Filed: Dec. 3, 2010

(65) Prior Publication Data

US 2011/0173170 A1 Jul. 14, 2011

(30) Foreign Application Priority Data

Dec. 15, 2009 (JP) ................................ 2009-284312

(51) Int. Cl.
*G06F 17/30* (2006.01)
(52) U.S. Cl. ...................................................... 707/784
(58) Field of Classification Search .................... 707/784
See application file for complete search history.

(56) References Cited

U.S. PATENT DOCUMENTS

| 5,220,501 | A | * | 6/1993 | Lawlor et al. ................... 705/40 |
| 6,140,922 | A | * | 10/2000 | Kakou ........................ 340/568.1 |
| 6,556,999 | B1 | * | 4/2003 | Kloos et al. ........................... 1/1 |
| 7,089,247 | B2 | * | 8/2006 | Kloos et al. ........................... 1/1 |
| 7,493,344 | B2 | * | 2/2009 | Wald et al. ............................ 1/1 |
| 7,899,783 | B1 | * | 3/2011 | Xu et al. ........................ 707/613 |
| 8,146,077 | B2 | * | 3/2012 | McNally et al. .............. 717/177 |
| 2002/0038289 | A1 | * | 3/2002 | Lawlor et al. ................... 705/42 |
| 2003/0163488 | A1 | * | 8/2003 | Kloos et al. ................... 707/200 |
| 2006/0224638 | A1 | * | 10/2006 | Wald et al. .................... 707/200 |
| 2007/0016563 | A1 | * | 1/2007 | Omoigui ............................ 707/3 |
| 2011/0145300 | A1 | * | 6/2011 | Hiruma et al. ................ 707/802 |

FOREIGN PATENT DOCUMENTS

| JP | 2004-246755 | 9/2004 |
| JP | 2007-531941 | 11/2007 |

OTHER PUBLICATIONS

Japanese Office Action for Japanese Patent Application No. 2009-284312 mailed on Sep. 27, 2011.
Excel + Access 2007 Senkei Supateku 390 (390 Super Techniques through Cooperation of Excel and Access 2007), Shoeisha Co., Ltd., Nov. 12, 2007, First Edition, pp. 439, 441 and 442.

* cited by examiner

*Primary Examiner* — Mark Andrew X Radtke
(74) *Attorney, Agent, or Firm* — Turocy & Watson, LLP

(57) ABSTRACT

According to one embodiment, a database system includes first, second and third storing units, and an image generating unit. The first storing unit stores a first data table that describes plural first data records respectively including information concerning plural information fields. The second storing unit stores a second data table that describes second data records each including plural kinds of attribute information respectively representing display attributes concerning the information fields. The third storing unit stores, concerning the information, display definition data that describes plural kinds of attribute information respectively representing display attributes set independently of the display attributes represented by the attribute information. The image generating unit generates a display image simultaneously representing a first image for displaying the information according to the display attributes represented by the attribute information and a second image for displaying the information according to the display attributes represented by the attribute information.

8 Claims, 21 Drawing Sheets

| Company code | USER_ID | USER_NAME | PASSWORD | STORE_ID | FFU1 | FFU2 | FFU3 | FFU4 | FFU5 |
|---|---|---|---|---|---|---|---|---|---|
| 001 | user01 | Store clerk 01 | Pass01 | 001 | 0 | 03-1234-1111 | | | |
| 001 | user02 | Store clerk 02 | Pass02 | 001 | 1 | 0558-99-8888 | | | |
| 002 | user03 | Store clerk 03 | Pass03 | 002 | Tokyo | 1968/10/09 | | | |
| 002 | user04 | Store clerk 04 | Pass04 | 003 | Shizuoka | 1980/05/08 | | | |
| | | | | | | | | | |

F I G. 4

| Company code | Display index | Logical field name | Physical field name | Type | Display name | Display application | Update application | Input application | Comment |
|---|---|---|---|---|---|---|---|---|---|
| 999 | 1 | USER_ID | USER_ID | string | User ID | 1 | 1 | 1 | |
| 999 | 2 | USER_NAME | USER_NAME | string | User name | 1 | 1 | 1 | |
| 999 | 3 | PASSWORD | PASSWORD | string | Password | 0 | 1 | 1 | |
| 999 | 4 | STORE_ID | STORE_ID | string | Store ID | 0 | 1 | 1 | |
| 999 | 5 | FFU1 | FFU1 | string | FFU1 | 0 | 0 | 0 | |
| 999 | 6 | FFU2 | FFU2 | string | FFU2 | 0 | 0 | 0 | |
| 001 | | AUTHO_LEV | FFU1 | string | Authority Level | 0 | 1 | 1 | |
| 001 | 3 | TEL_NO | FFU2 | string | Telephone Number | 1 | 1 | 1 | |
| 002 | 5 | COUNTRY | FFU1 | string | Birthplace | 1 | 1 | 1 | |
| 002 | 6 | BIRTHDAY | FFU2 | Date | Date of birth | 1 | 1 | 1 | |

F I G. 5

| Company code | USER_ID | USER_NAME | PASSWORD | STORE_ID | FFU1 | FFU2 | FFU3 | FFU4 | FFU5 |
|---|---|---|---|---|---|---|---|---|---|
| 001 | user01 | Store clerk 01 | Pass01 | 0001 | 0 | | | | |
| 001 | user02 | Store clerk 02 | Pass02 | 0001 | 1 | | | | |

FIG. 7

| Company code | Display index | Logical field name | Physical field name | Type | Display name | Display application | Update application | Input application | Comment |
|---|---|---|---|---|---|---|---|---|---|
| 999 | 1 | USER_ID | USER_ID | string | User ID | 1 | 1 | 1 | |
| 999 | 2 | USER_NAME | USER_NAME | string | User name | 1 | 1 | 1 | |
| 999 | 3 | PASSWORD | PASSWORD | string | Password | 0 | 1 | 1 | |
| 999 | 4 | STORE_ID | STORE_ID | string | Store ID | 0 | 1 | 1 | |
| 999 | 5 | FFU1 | FFU1 | string | FFU1 | 0 | 0 | 0 | |
| 999 | 6 | FFU2 | FFU2 | string | FFU2 | 0 | 0 | 0 | |
| 001 | | AUTHO_LEV | FFU1 | string | Authority level | 0 | 1 | 1 | |
| 001 | 5 | TEL_NO | FFU2 | string | Telephone number | 1 | 1 | 1 | |

FIG. 8

| User ID | User name | Telephone number |
|---|---|---|
| user01 | Store clerk 01 | 03-1234-1111 |
| user02 | Store clerk 02 | 0558-99-8888 |
| | | |
| | | |
| | | |

F I G. 9

| User ID | User name | Birthplace | Date of birth |
|---|---|---|---|
| user03 | Store clerk 03 | Tokyo | 1968/10/09 |
| user04 | Store clerk 04 | Shizuoka | 1980/05/08 |
| | | | |
| | | | |
| | | | |

To top menu | User master maintenance

Database [TEC_COM_BAS▼] Table [CB_UserMaster▼]

Field
User ID
User name
Password
Store ID
Authority level
Telephone number
FFU3

Detailed information
Display index | 4
Display name
Logical field name
Data type
Display application [Display] [Not display]
Update application [Update] [Not update]
Input application [Input] [Not input]
Comment Physical field name [FFU3]

Preview
| User ID | User name | Telephone number | FFU3 |
|---|---|---|---|
| user01 | Store clerk 01 | 03-1234-1111 | |
| user02 | Store clerk 02 | 0558-99-8888 | |

[End] [Add] [Edit] [Delete] [Up] [Down] [Return] [Decide]

2009/09/14(Mon) 14:34

To top menu | User master maintenance

Database [TEC_COM_BAS▼] Table [CB_UserMaster▼]

Detailed information
- Display index: 4 | Physical field name: FFU3
- Display name: Cellular phone number
- Logical field name: MOBILE_NO
- Data type:
- Display application: [Display] [Not display]
- Update application: [Update] [Not update]
- Input application: [Input] [Not input]
- Comment:

Field (71)
- User ID
- User name
- Password
- Store ID
- Authority level
- Telephone number
- Cellular phone number

Preview (73)

| User ID | User name | Telephone number | Cellular phone number |
|---------|-----------|------------------|----------------------|
| user01 | Store clerk 01 | 03-1234-1111 | |
| user02 | Store clerk 02 | 0558-99-8888 | |

[End] [Add] [Edit] [Delete] [Up] [Down] [Return] [Decide]

| Company code | Display index | Logical field name | Physical field name | Type | Display name | Display application | Update application | Input application | Comment |
|---|---|---|---|---|---|---|---|---|---|
| 999 | 1 | USER_ID | USER_ID | string | User ID | 1 | 1 | 1 | |
| 999 | 2 | USER_NAME | USER_NAME | string | User name | 1 | 1 | 1 | |
| 999 | 3 | PASSWORD | PASSWORD | string | Password | 0 | 1 | 1 | |
| 999 | 4 | STORE_ID | STORE_ID | string | Store ID | 0 | 1 | 1 | |
| 999 | 5 | FFU1 | FFU1 | string | FFU1 | 0 | 0 | 0 | |
| 999 | 6 | FFU2 | FFU2 | string | FFU2 | 0 | 0 | 0 | |
| 001 | | AUTHO_LEV | FFU1 | string | Authority Level | 1 | 1 | 1 | |
| 001 | 3 | TEL_NO | FFU2 | string | Telephone Number | 1 | 1 | 1 | |
| 001 | 4 | MOBILE_NO | FFU3 | string | Cellular phone number | 1 | 1 | 1 | |
| 002 | 5 | COUNTRY | FFU1 | string | Birthplace | 1 | 1 | 1 | |
| 002 | 6 | BIRTHDAY | FFU2 | Date | Date of birth | 1 | 1 | 1 | |

F I G. 17

| Company code | USER_ID | user_NAME | PASSWORD | STORE_ID | FFU1 | FFU2 | FFU3 | FFU4 | FFU5 |
|---|---|---|---|---|---|---|---|---|---|
| 001 | user01 | Store clerk 01 | Pass01 | 001 | 0 | 03-1234-1111 | 080-1111-2222 | | |
| 001 | user02 | Store clerk 02 | Pass02 | 001 | 1 | 0558-99-8888 | 090-9999-0000 | | |
| 002 | user03 | Store clerk 03 | Pass03 | 002 | Tokyo | 1968/10/09 | | | |
| 002 | user04 | Store clerk 04 | Pass04 | 003 | Shizuoka | 1980/05/08 | | | |
| | | | | | | | | | |

F I G. 18

| User ID | User name | Telephone number | Cellular phone number |
|---------|-----------|------------------|----------------------|
| user01 | Store clerk 01 | 03-1234-1111 | 080-1111-2222 |
| user02 | Store clerk 02 | 0558-99-8888 | 090-9999-0000 |
| | | | |
| | | | |
| | | | |

F I G. 19

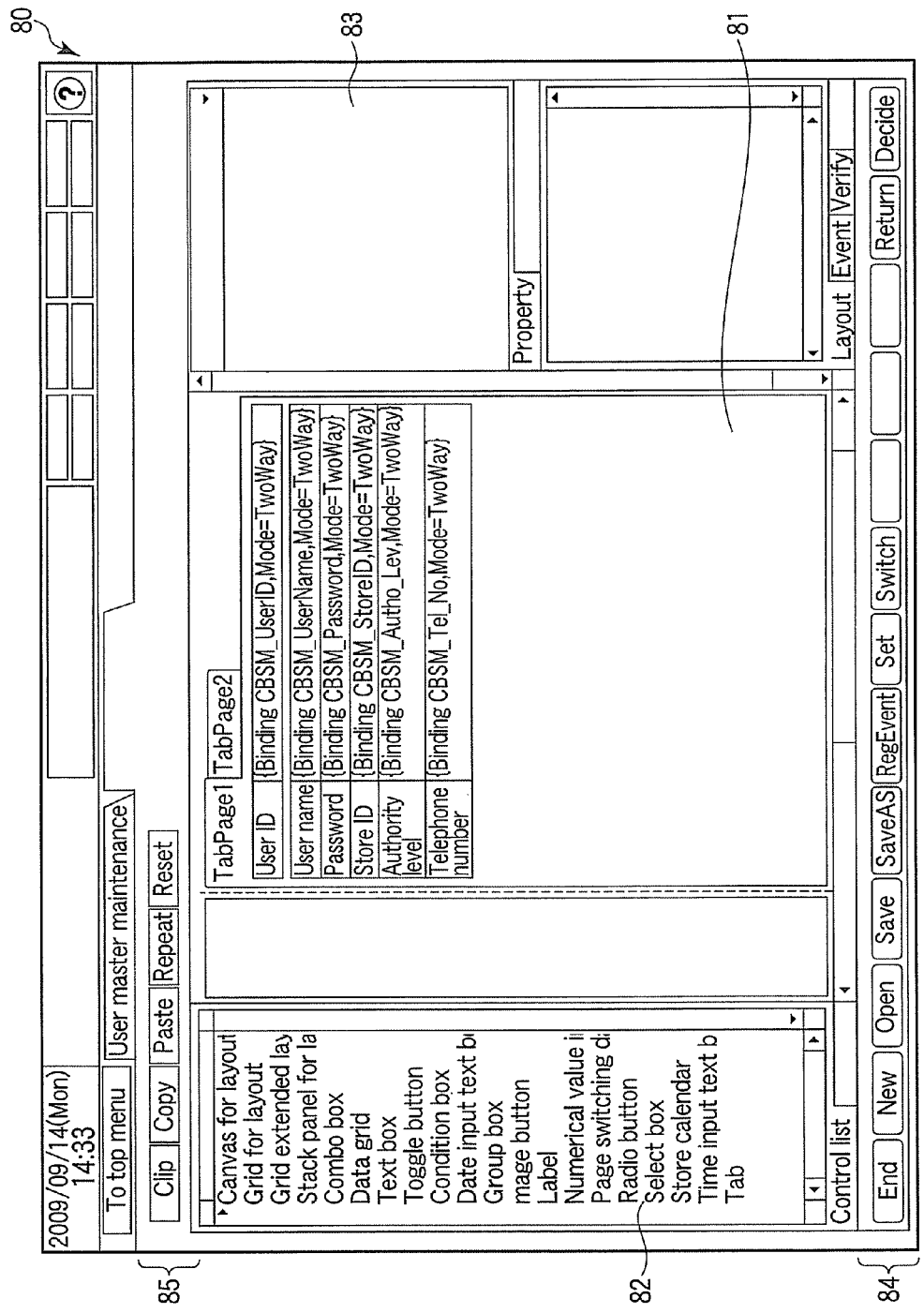
F I G. 22

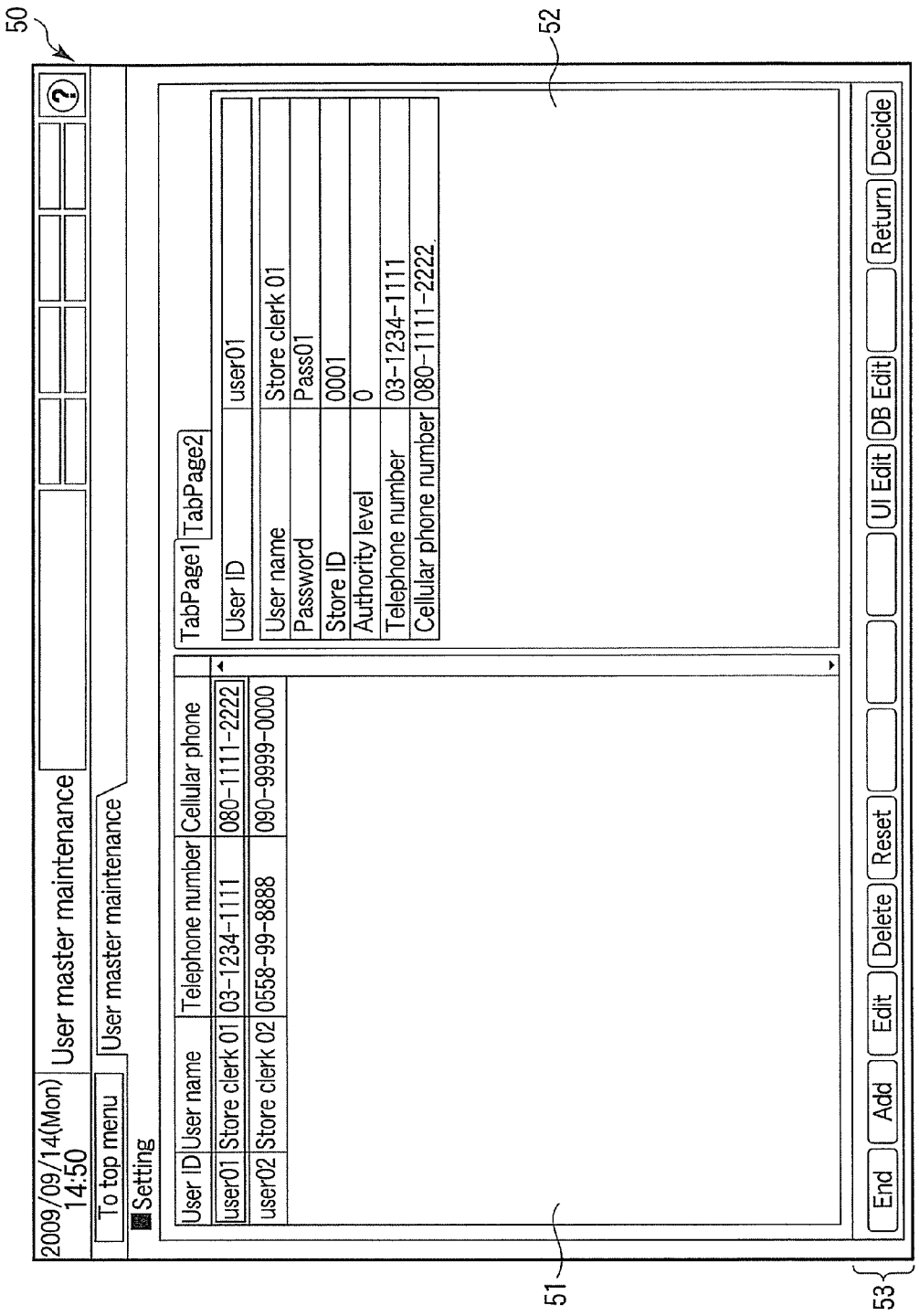
F I G. 24

US 8,380,746 B2

DATABASE SYSTEM, TERMINAL APPARATUS, AND METHOD OF GENERATING DISPLAY IMAGE

CROSS-REFERENCE TO RELATED APPLICATION

This application is based upon and claims the benefit of priority from Japanese Patent Application No. 2009-284312, filed on Dec. 15, 2009; the entire contents of which are incorporated herein by reference.

FIELD

Embodiments described herein relate generally to a database system, a terminal apparatus, and a method of generating a display image.

BACKGROUND

In general, most database systems such as a database system included in a POS (point-of-sale) system are designed according to needs of users of the database systems (e.g., companies). A technique for making it possible to easily design such custom-made database systems is disclosed in, for example, JP-A-2004-246755.

However, in such custom-made database systems, as an application for generating a display image representing information described in a database, a dedicated application corresponding to the structure of the database needs to be individually developed. When the structure of the database is updated, the application needs to be changed according to the update of the structure of the database.

Under such circumstances, it is desired to make it possible to customize, for each of users, a use form of a database that enables, through common processing, generation of display images respectively representing described information in a display form of each of the users.

DESCRIPTION OF THE DRAWINGS

FIG. 4 is a diagram of an example of a master table shown in FIG. 1;

FIG. 5 is a diagram of an example of a master attribute table shown in FIG. 1;

FIG. 7 is a diagram of an example of an extracted master table;

FIG. 8 is a diagram of an example of an extracted attribute table;

FIG. 9 is a diagram of a first example of a display image;

FIG. 10 is a diagram of a second example of the display image;

FIG. 13 is a diagram of an example of an image for confirmation;

FIG. 14 is a diagram of an example of an image for editing;

FIG. 15 is a diagram of an example of an image for addition;

FIG. 16 is a diagram of an example of the updated image for addition;

FIG. 17 is a diagram of an example of the master attribute table after update;

FIG. 18 is a diagram of an example of a use form of the master table customized by the update of the master attribute table;

FIG. 19 is a diagram of an example of a display image based on the master attribute table and the master table respectively shown in FIG. 17 and FIG. 18;

FIG. 22 is a diagram of an example of the image for editing;

FIG. 24 is a diagram of an example of an image for confirmation based on an updated UI definition file.

DETAILED DESCRIPTION

In general, according to one embodiment, a database system includes a first storing unit, a second storing unit, a third storing unit, and an image generating unit. The first storing unit stores a first data table that describes plural first data records respectively including information concerning plural information fields. The second storing unit stores a second data table that describes second data records each including plural kinds of attribute information respectively representing display attributes concerning the information fields included in the first data records. The third storing unit stores, concerning the information stored in the first storing unit, display definition data that describes plural kinds of attribute information respectively representing display attributes set independent of the display attributes represented by the attribute information included in the second data records. The image generating unit generates a display image simultaneously representing a first image for displaying the information included in the first data records according to the display attributes represented by the attribute information included in the second data records and a second image for displaying the information included in the first data records according to the display attributes represented by the attribute information described in the display definition data.

An embodiment is explained below with reference to the drawings.

Figure 1:
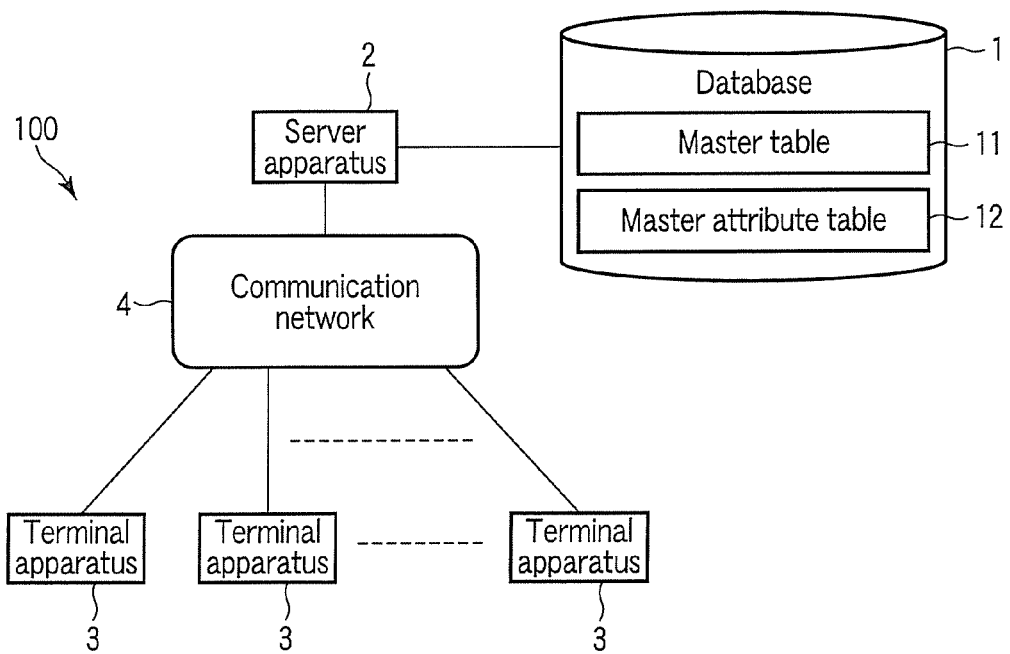
FIG. 1 is a block diagram of a database system according to an embodiment.

FIG. 1 is a block diagram of a database system 100 according to this embodiment.

The database system 100 includes a database 1, a server apparatus 2, and plural terminal apparatuses 3.

The database 1 is connected to the server apparatus 2. Each of the plural terminal apparatuses 3 can communicate with the server apparatus 2 via a communication network 4. The communication network 4 is typically the Internet. However, other various networks such as an intranet and a PSTN (public switched telephone network) can be used.

For example, the database system 100 can be used to cause plural companies to share the database 1 in order to manage information concerning store clerks. In this case, for example, the database 1 and the server apparatus 2 are operated by a provider that provides the service explained above. The terminal apparatuses 3 are provided in a company as a user that uses the service. In the following explanation, it is assumed that the database system 100 is built to provide the service.

The information managed by the database system 100 and the user who accesses the information may be arbitrary. A service provided by the database system 100 is not limited to the service explained above. For example, the database 1 and the server apparatus 2 may be operated by the provider that provides the service and the terminal apparatuses 3 may be used by plural employees of one company. Alternatively, the database 1 and the server apparatus 2 may be operated by a company and the terminal apparatuses 3 may be used by plural employees of the company. In these cases, users of the service provided by the database system 100 are the employees. Alternatively, for example, the database 1 and the server apparatus 2 may be operated by the provider that provides the service and the terminal apparatuses 3 may be used by unspecified plural people registered in the provider to use the terminal apparatuses 3. In this case, users of the service provided by the database system 100 are registered users.

The database 1 is configured by storing a master table 11 and a master attribute table 12 in a storage medium such as a hard disk. When the hard disk is used as the recording medium, the database 1 includes an access device for reading data from and writing data in the hard disk. Further, the database 1 includes an interface unit for exchanging data between the server apparatus 2 and the database 1.

Figure 2:
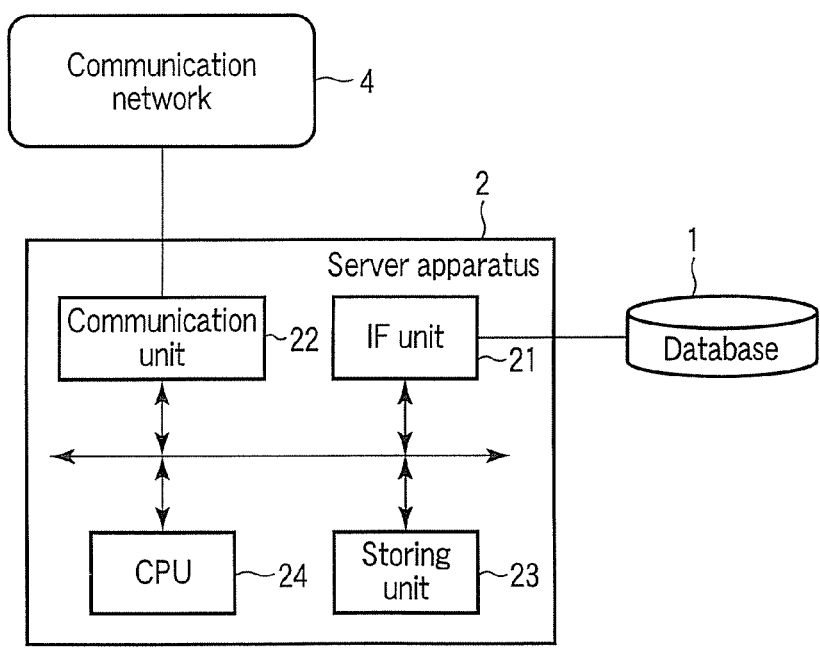
FIG. 2 is a block diagram of a server apparatus shown in FIG. 1.

FIG. 2 is a block diagram of the server apparatus 2.

In the server apparatus 2, for example, a computer apparatus for a server can be used as basic hardware. The server apparatus 2 includes an interface unit (IF unit) 21, a communication unit 22, a storing unit 23, and a CPU 24.

The interface unit 21 exchanges data between the server apparatus 2 and the database 1.

The communication unit 22 performs well-known communication processing for communicating with the terminal apparatuses 3 via the communication network 4.

The storing unit 23 stores various computer programs that describe procedures of processing that should be performed by the CPU 24 and various kinds of information such as data read out from the database 1. As the storing unit 23, for example, a storage device such as a memory or a hard disk device incorporated in the computer apparatus, a storage device such as a memory or a hard disk device externally attached to the computer apparatus, or a removable recording medium such as a magnetic disk, a magneto-optical disk, or an optical disk can be used as appropriate. The computer programs stored by the storing unit 23 include a management application for causing the CPU 24 to perform management processing for the database 1 explained later.

The CPU 24 performs various kinds of processing according to the computer programs stored in the storing unit 23. The CPU 24 functions as several units explained below according to processing conforming to the management application. A part of the units realizes access processing for enabling access from the terminal apparatuses 3 to the master table 11 and maintenance processing for maintaining the master attribute table 12. However, the CPU 24 may function as, according to kinds of processing respectively conforming to separate application programs, the units for realizing the access processing and the units for realizing the maintenance processing.

The units for realizing the access processing include units explained below. One of the units identifies and authenticates a company that requests access to information stored in the database 1 from the terminal apparatuses 3 (hereinafter referred to as access source company). One of the units reads out, from the database 1, data records described in the master table 11 in association with the access source company. One of the units reads out, from the database 1, data records described in the master attribute table 12 in association with the access source company. One of the units controls the communication unit 22 to transmit the read-out data records to the terminal apparatus used for requesting the access (hereinafter referred to as access request source terminal apparatus) 3.

The units for realizing the maintenance processing include units explained below. One of the units identifies and authenticates a company that requests a change of the master attribute table 12 (hereinafter referred to as change requesting company). One of the units controls the communication unit 22 to transmit response information representing a result of the identification and the authentication to the terminal apparatus used for the request for the change (hereinafter referred to as change request source terminal apparatus) 3. One of the units controls the communication unit 22 to receive data records transmitted from the change request source terminal apparatus 3 according to the transmission of the identification information. One of the units updates the master attribute table 12 to include, as data records associated with the change requesting company, the data records received by the communication unit 22.

A part or all of the functions of the CPU 24 can also be realized by hardware such as a logic circuit. Each of the functions of the CPU 24 can also be realized by combining the hardware and software control.

Figure 3:
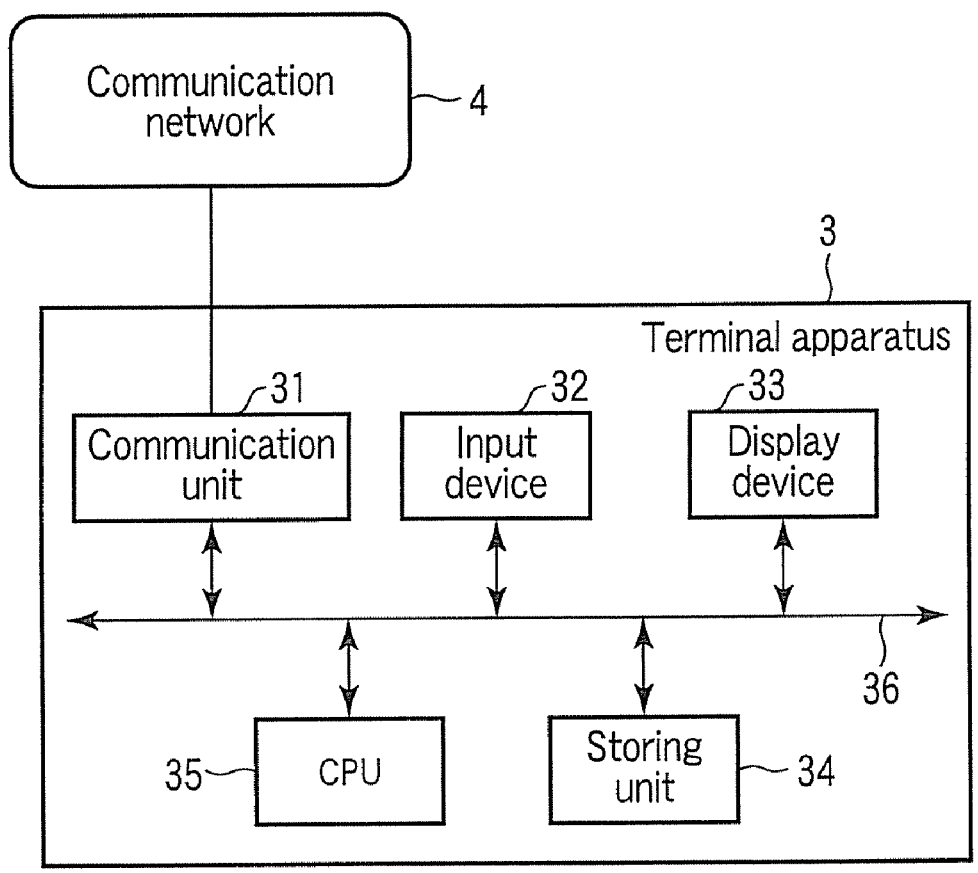
FIG. 3 is a block diagram of a terminal apparatus shown in FIG. 1.

FIG. 3 is a block diagram of the terminal apparatus 3.

In each of the terminal apparatuses 3, a computer apparatus such as a general-purpose personal computer can be used as basic hardware. The terminal apparatus 3 includes a communication unit 31, an input device 32, a display device 33, a storing unit 34, and a CPU 35.

The communication unit 31 performs well-known communication processing for communicating with the server apparatus 2 via the communication network 4.

The input device 32 inputs various instructions by a user. The input device 32 can include well-known various input devices such as a keyboard and a mouse.

The display device 33 displays, for example, an image for causing the user to view various kinds of information. As the display device 33, well-known various display devices such as a liquid crystal display can be used. A general-purpose display device not included in the terminal apparatus 3 but externally attached thereto can be used as the display device 33.

The storing unit 34 stores, for example, various computer programs that describe procedures of processing that should be performed by the CPU 35 and data treated by the processing of the CPU 35 based on the computer programs. As the storing unit 34, for example, a storage device such as a memory or a hard disk device incorporated in the computer apparatus, a storage device such as a memory or a hard disk device externally attached to the computer apparatus, or a removable recording medium such as a magnetic disk, a magneto-optical disk, or an optical disk can be used as appropriate. The computer programs stored by the storing unit 34 include an access application for causing the CPU 35 to perform access processing to the database 1 explained later. The computer programs stored by the storing unit 34 include generation middleware for causing, on the basis of data passed from the access application, the CPU 35 to perform processing for generating a display image for causing the user to view information stored in the database 1. The computer programs stored by the storing unit 34 include a maintenance application program for requesting the server apparatus 2 to maintain the master attribute table 12 in order to customize the master table 11.

The CPU 35 performs various kinds of processing according to the computer programs stored in the storing unit 34. The CPU 35 functions as several units explained below according to processing conforming to the access application. One of the units controls the communication unit 31 to acquire information for causing the server apparatus 2 to identify and authenticate a company and transmit the information to the server apparatus 2. One of the units controls the communication unit 31 to receive data records transmitted from the server apparatus 2. One of the units controls processing for generating a display image according to the generation middleware. One of the units controls the display device 33 to display the generated display image.

The CPU 35 functions as several units explained below according to processing conforming to the maintenance application program. One of the units controls the communication unit 31 to receive response information representing a result of the identification and the authentication transmitted by the server apparatus 2. One of the units detects an information field not used by the change requesting company out of the information fields included in the master table 11. One of the units acquires, according to an instruction of an operator, attribute information concerning the information field detected by the unit explained above. One of the units generates a data record including the acquired attribute information and identification information of the information field detected by the unit explained above. One of the units controls the communication unit 31 to transmit the generated data record to the server apparatus 2 as a data record that should be added to the master attribute table 12.

A part or all of the functions of the CPU 35 can also be realized by hardware such as a logic circuit. Each of the functions of the CPU 35 can also be realized by combining the hardware and software control.

FIG. 4 is a diagram of an example of the master table 11.

The master table 11 is a data table that describes plural data records. Each of the data records included in the master table 11 includes information concerning plural information fields respectively corresponding to plural items. In the example shown in FIG. 4, information fields included in one data record respectively concern items such as a company code, a user ID (USER_ID), a user name (USER_NAME), a password (PASSWORD), a store ID (STORE_ID), and first to fifth extended items (FFU1 to FFU5). Among these information fields, the information fields respectively concerning the company code, the user ID, the user name, the password, and the store ID are used to describe information concerning items common to plural companies. The information fields respectively concerning the first to fifth extended items are used to describe information concerning individual items in the plural companies. The data records included in the master table 11 are associated with companies identified by information described in the information fields of "company code" included in the data records.

FIG. 5 is a diagram of an example of the master attribute table 12.

The master attribute table 12 is a data table that describes plural data records. Each of the data records included in the master attribute table 12 includes information concerning plural information fields respectively corresponding to plural items. In the example shown in FIG. 5, the information fields included in one data record respectively concern a company code, a display index, a logical field name, a physical field name, a type, a display name, display application, update application, input application, and a comment. Information described in these information fields is attribute information of the information included in the master table 11. A part of the information represents display attributes of the information included in the master table 11. Specifically, in FIG. 5, information described in the information fields of the display index, the logical field name, the physical field name, the type, the display name, and the display application represent the display attributes. The data records included in the master attribute table 12 are associated with companies identified by information described in the information fields of "company code" included in the data records.

The operation of the database system 100 configured as above is explained below.

Figure 6:
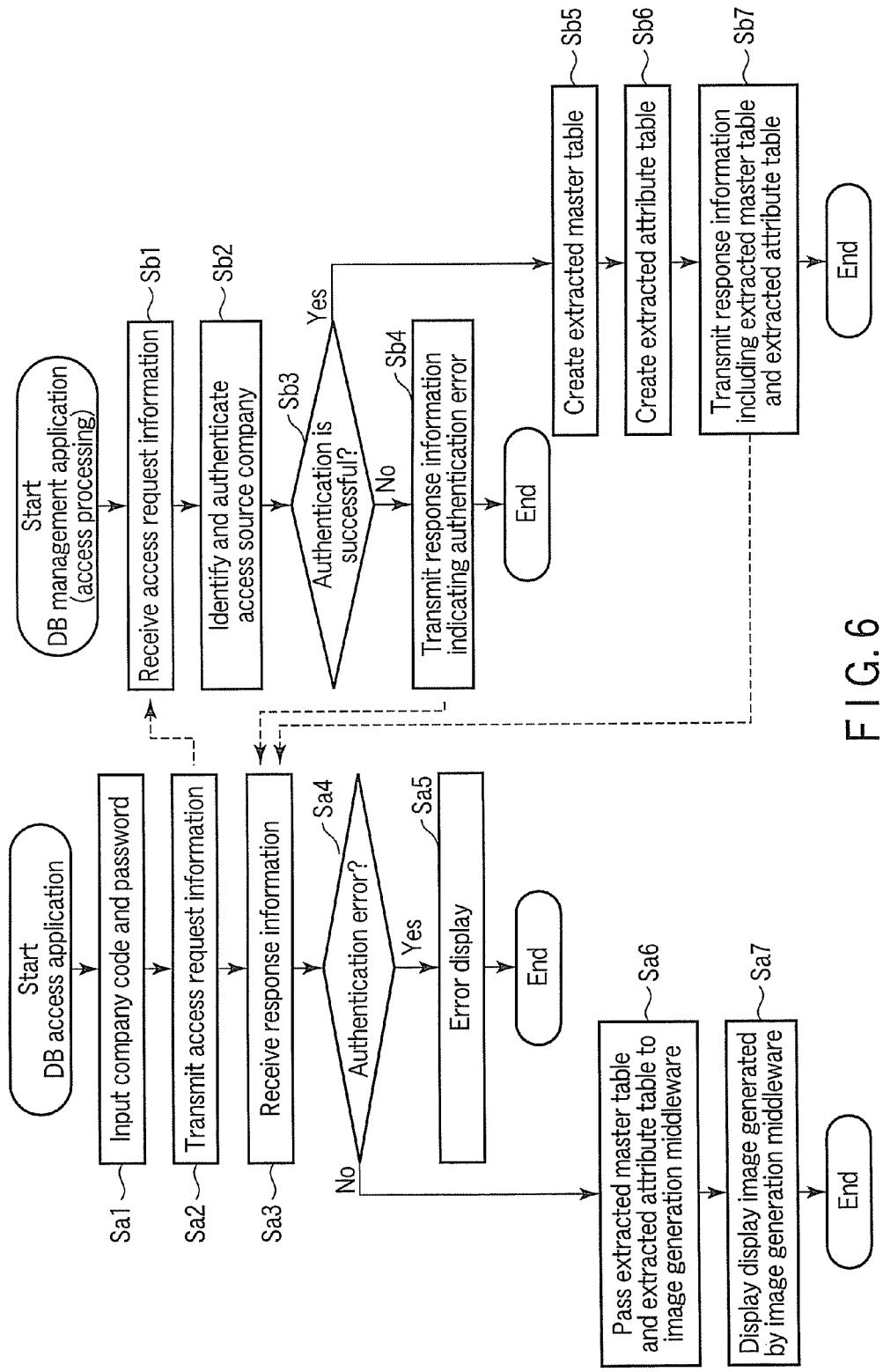
FIG. 6 is a flowchart for explaining each of processing procedures of a CPU shown in FIG. 2 and a CPU shown in FIG. 3.

FIG. 6 is a flowchart for explaining each of processing procedures of the CPUs 24 and 35. The flowchart on the left in FIG. 6 indicates a processing procedure conforming to the access application of the CPU 35. The flowchart on the right in FIG. 6 indicates a processing procedure in access processing conforming to the management application of the CPU 24.

In Act Sa1, the CPU 35 causes an operator of the terminal apparatus 3 to designate a company code and a password allocated to a company to which the operator belongs and inputs the designated company code and password. For example, the input device 32 is used for the input.

In Act Sa2, the CPU 35 creates authentication request information including the company code and the password input in Act Sa1 and transmits the authentication request information from the communication unit 31 to the server apparatus 2 via the communication network 4.

When the authentication request information transmitted from the terminal apparatus 3 as explained above reaches the server apparatus 2, in Act Sb1, the CPU 24 receives the authentication request information via the communication unit 22.

In Act Sb2, the CPU 24 recognizes an access source company on the basis of the company code included in the received authentication request information and checks whether the password included in the authentication request information is set for the access source company to thereby authenticate the access source company.

In Act Sb3, the CPU 24 checks whether the authentication is successful. If the CPU 24 fails in the authentication, the CPU 24 proceeds to Act Sb4.

In Act Sb4, the CPU 24 transmits, via the communication network 4, response information for notifying the terminal apparatus 3 of an authentication error from the communication unit 22 to the terminal apparatus 3 as a transmission source of the authentication request information received in Act Sb1.

On the other hand, if the CPU 24 succeeds in the authentication, the CPU 24 proceeds from Act Sb3 to Act Sb5.

In Act Sb5, the CPU 24 creates an extracted master table. Specifically, the CPU 24 reads out, from the master table 11, data records associated with the access source company among the data records described in the master table 11. The data records associated with the access source company in the master table 11 are data records in which information described in the information field concerning the company code coincides with the company code included in the authentication request information received in Act Sb1. The CPU 24 creates an extracted master table as a set of all relevant data records.

FIG. 7 is a diagram of an example of the extracted master table. The extracted master table shown in FIG. 7 is created when the master table 11 is as shown in FIG. 4 and the company code of the access source company is "001".

In Act Sb6, the CPU 24 creates an extracted attribute table. Specifically, the CPU 24 reads out, from the master table 11, data records of the access source company among the data records described in the master attribute table 12. The data records associated with the access source company in the master attribute table 12 are data records in which information described in the information field concerning the company code is a common code and data records in which information described in the information field concerning the company code coincides with the company code included in the authentication request information received in Act Sb1. The CPU 24 creates an extracted attribute table as a set of all relevant data records.

FIG. 8 is a diagram of an example of the extracted attribute table. The extracted attribute table shown in FIG. 8 is created when the master attribute table 12 is as shown in FIG. 5 and the common code is "999" and the company code of the access source company is "001".

In Act Sb7, the CPU 24 transmits, via the communication network 4, response information including the extracted master table and the extracted attribute table created as explained above from the communication unit 22 to the terminal apparatus 3 as the transmission source of the authentication request information received in Act Sb1.

After transmitting the access request information in Act Sa2, the CPU 35 waits for the response information transmitted from the server apparatus 2 to reach the terminal apparatus 3. When the response information transmitted from the server apparatus 2 by the processing of the CPU 24 in Act Sb4 or Act Sb7 reaches the terminal apparatus 3, in Act Sa3, the CPU 35 causes the communication unit 31 to receive the response information and then acquires the response information from the communication unit 31.

In Act Sa4, the CPU 35 checks whether the response information notifies an authentication error. If an authentication error is notified, the CPU 35 proceeds from Act Sa4 to Act Sa5.

In Act Sa5, the CPU 35 causes the display device 33 to perform error display for notifying the operator of the authentication error.

On the other hand, if the response information does not notify an authentication error, the CPU 35 proceeds from Act Sa4 to Act Sa6.

In Act Sa6, the CPU 35 passes the extracted master table and the extracted attribute table included in the response information to the processing by the generation middleware. Specifically, the CPU 35 starts image generation processing conforming to the generation middleware separately from the processing conforming to the access application and sets the extracted master table and the extracted attribute table included in the response information as targets of the image generation processing. According to the image generation processing, the CPU 35 generates a display image in which the information included in the extracted master table is represented in a display form defined by the information described in the extracted attribute table.

Specifically, in the extracted attribute table shown in FIG. 8, the information of the information fields of the display index, the logical field name, the physical field name, the type, the display name, and the display application represents a display form for representing the information included in the extracted master table in a table format.

In the information field of the display index, numerical values are described. The numerical values indicate column numbers.

In the information field of the logical field name, names arbitrarily allocated to the information fields of the master table 11 by companies are described.

In the information field of the physical field name, names uniquely allocated to the information fields of the master table 11 are described. Therefore, in data records in which values of the information field of the company code are 999, i.e., data records associated with all the companies, physical field names are always the same as logical field names as shown in FIG. 8. In data records in which values of the information field of the company code are other than 999, i.e., data records associated with only a specific company, physical field names may be the same as logical field names or may be different from logical field names as shown in FIG. 8. It is indicated that information described in the information field to which the names described in the information field of the physical field name are allocated among the information fields of the master table 11 is information that should be described in spaces of the column numbers.

In the information field of the type, types of the information displayed in the spaces of the column numbers are described.

In the information field of the display name, display names concerning columns of the column numbers are described.

In the information field of the display application, a value of 0 or 1 is described. Data records in which the values of the information field are 1 are information effective for defining a display form.

Specifically, for example, in a first data record shown in FIG. 8, it is defined that a display name of a space in a first column is "user ID" and information described in the information field of USER_ID of the master table 11 is displayed in this space.

Consequently, the CPU 35 generates a display image shown in FIG. 9 on the basis of the extracted master table shown in FIG. 7 and the extracted attribute table shown in FIG. 8.

If the company code of the access source company is "002", the CPU 35 generates a display image shown in FIG. 10.

The CPU 35 causes the storing unit 34 to store image data representing the display image generated in this way.

In the processing conforming to the access application, in Act Sa7, the CPU 35 causes the display device 33 to display the display image generated as explained above.

Consequently, when a company with the company code "001" accesses the database 1, in the terminal apparatus 3, for example, the display image shown in FIG. 9 is displayed. On the other hand, when a company with the company code "002" accesses the database 1, in the terminal apparatus 3, for example, the display image shown in FIG. 10 is displayed.

In other words, with the database system 100, the master table 11 is shared by plural companies. However, the information fields concerning the first to fifth extended items (FFU1 to FFU5) among the information fields of the master table 11 can be used for describing information of different types for each of the companies. When the companies access the master table 11, in the terminal apparatuses 3, display images customized for each of the companies are displayed by common processing. When the structure of the master table 11 is changed, the descriptions of the master attribute table 12 only have to be changed according to the change of the structure. It is unnecessary to take any measures in the server apparatus 2 and the terminal apparatuses 3.

In the database system 100, the information fields for describing information concerning an item common to the plural companies and the information fields in which individual information of each of the companies can be described are prepared. In the master attribute table 12, a display form represented in data records in which the common code is described in the information field of the company code are applied to the companies in common. Therefore, when information of items frequently used in the plural companies is displayed in a standard form, it is unnecessary to describe data records for representing the display form in the master attribute table 12 for each of the companies. An information amount of the master attribute table 12 can be reduced.

Operation for updating the master attribute table 12 is explained.

Figure 11:
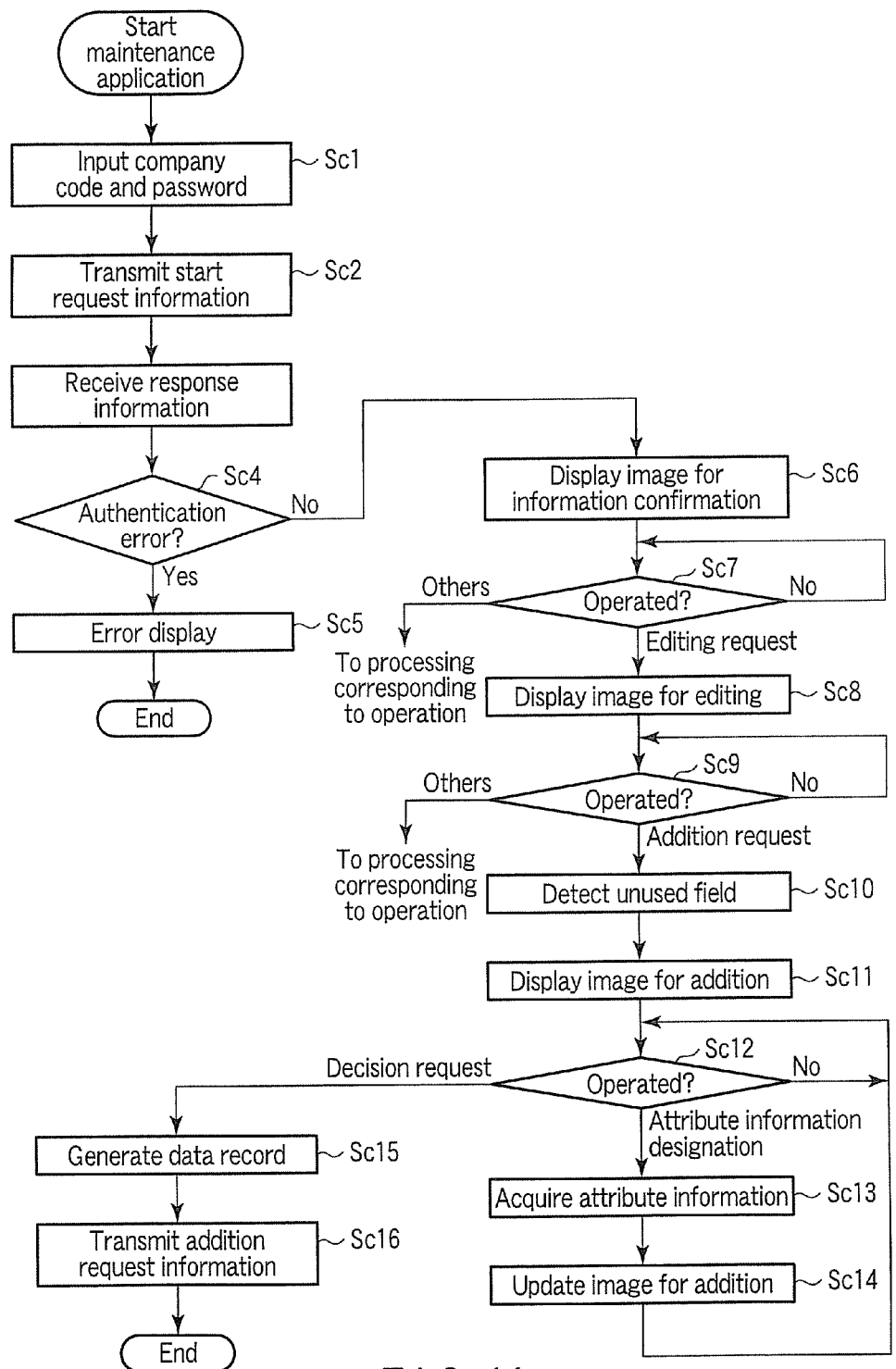
FIG. 11 is a flowchart in processing conforming to a maintenance application program of the CPU shown in FIG. 3.
Figure 12:
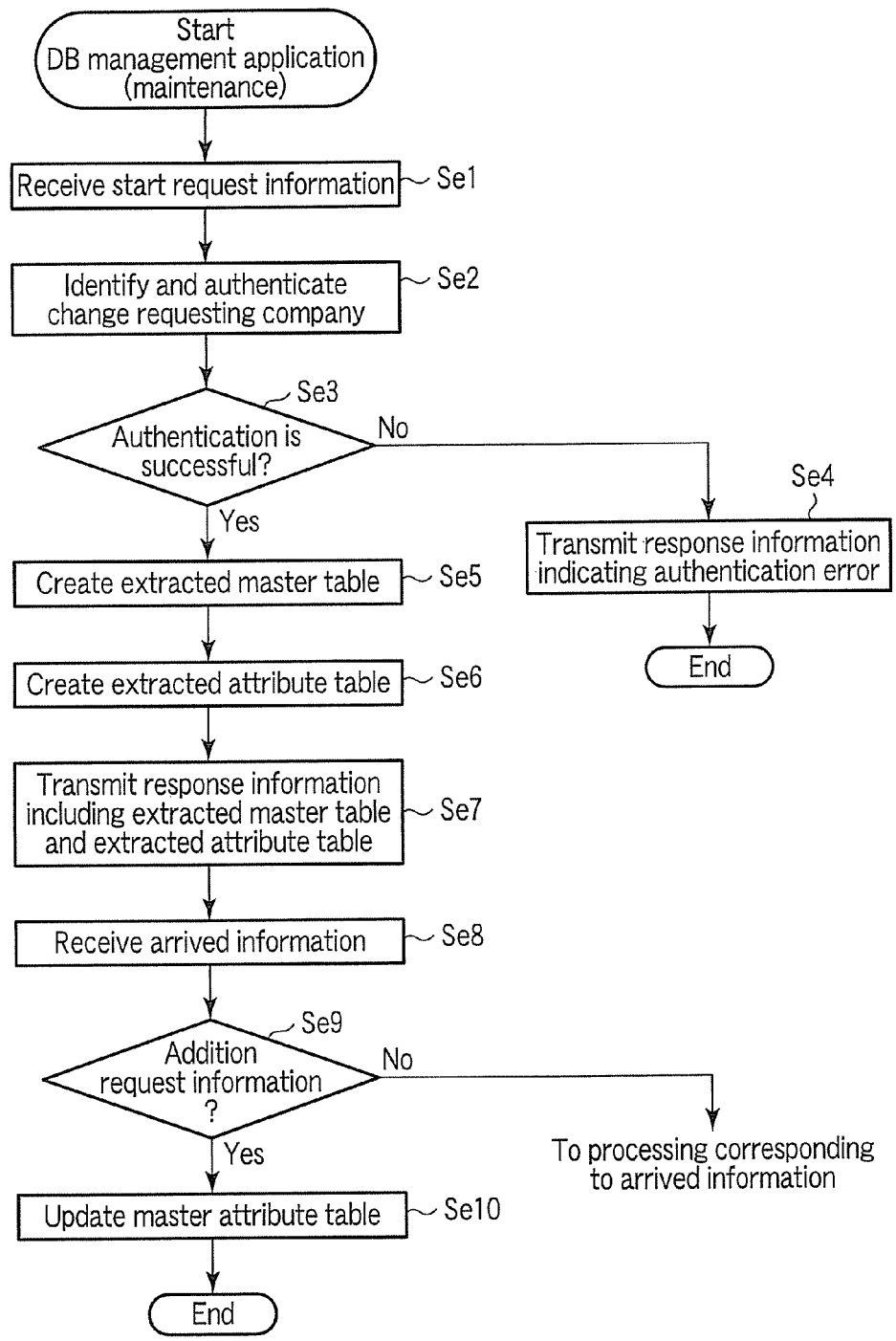
FIG. 12 is a flowchart in maintenance processing conforming to a management application of the CPU shown in FIG. 2.

FIG. 11 is a flowchart in the processing conforming to the maintenance application program of the CPU 35. FIG. 12 is a flowchart in the maintenance processing conforming to the management application of the CPU 24.

The CPU 35 executes processing in Acts Sc1 to Sc5 as processing same as the processing in Acts Sa1 to Sa5. The CPU 24 executes processing in Acts Se1 to Se7 as processing same as the processing in Acts Sb1 to Sb7. However, request information transmitted from the terminal apparatus 3 to the server apparatus 2 in Act Sc2 and Act Se1 is start request information for requesting the start of the maintenance processing. The start request information includes a company code and a password.

If the response information does not notify an authentication error, the CPU 35 proceeds from Act Sc4 to Act Sc6.

In Act Sc6, the CPU 35 generates an image for confirmation and causes the display device 33 to display the image for confirmation. The image for confirmation is an image for causing the operator to confirm the information described in the extracted master table in the response information received in Act Sc3.

Figure 13:
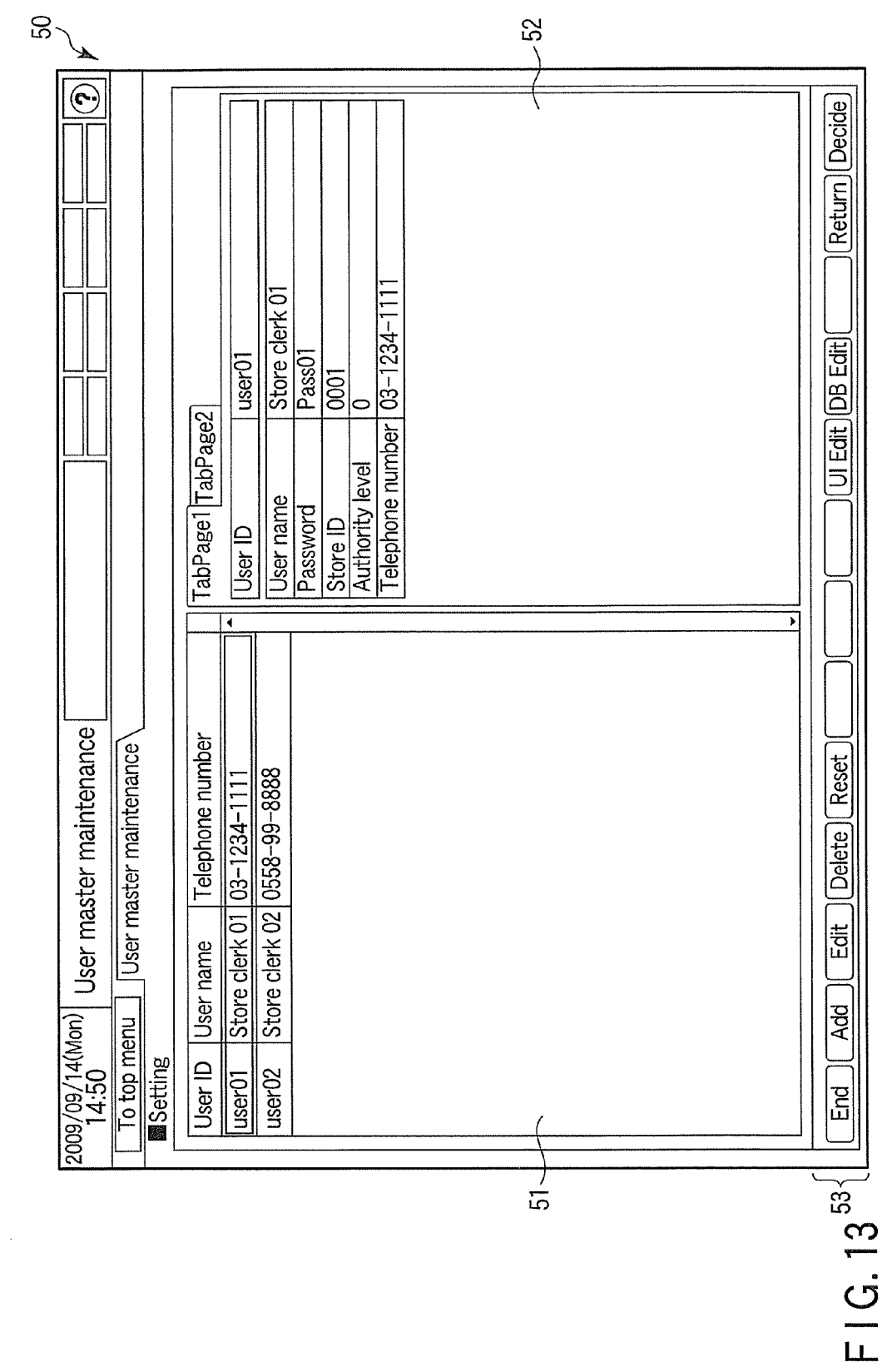

FIG. 13 is a diagram of an example of an image for confirmation 50.

The image for confirmation 50 includes areas 51 and 52 and a button group 53.

In the area 51, information included in the extracted master table is shown depending on the display attributes described in the extracted master attribute table. Therefore, only information concerning the information fields in which the display application is 1 is shown in the area 51.

In the area 52, information included in a selected data record among the data records included in the extracted master table (hereinafter referred to as selected master record) is shown depending on a setting unrelated to the extracted master attribute table. The area 52 can be used for showing information including, for example, information, the display application of which is 0. In the example shown in FIG. 13, all kinds of information included in one data record of the extracted master table are shown in the area 52.

In an initial period, the CPU 35 automatically selects arbitrary one data record (e.g., a data record located at the top of the extracted master table).

The button group 53 includes plural buttons. Kinds of processing that can be executed are respectively allocated to the plural buttons.

In Act Sc7, the CPU 35 waits for some operation to be performed by the operator in a state in which the image for confirmation 50 is displayed. If operation for requesting processing other than editing is performed, the CPU 35 shifts to the processing requested by the operation. For example, if an unselected data record is clicked in the area 51, the CPU 35 sets the clicked data record as a new selected master record and updates the area 52 to show information described in the new selected master record.

On the other hand, if editing of the existing data records is requested by, for example, operation of an editing button among the button group 53, the CPU 35 proceeds from Act Sc7 to Act Sc8. In Act Sc8, the CPU 35 generates an image for editing and causes the display device 33 to display the image for editing. The image for editing is an image for causing the operator to perform operation for editing the information already described in the data records included in the extracted attribute table.

Figure 14:
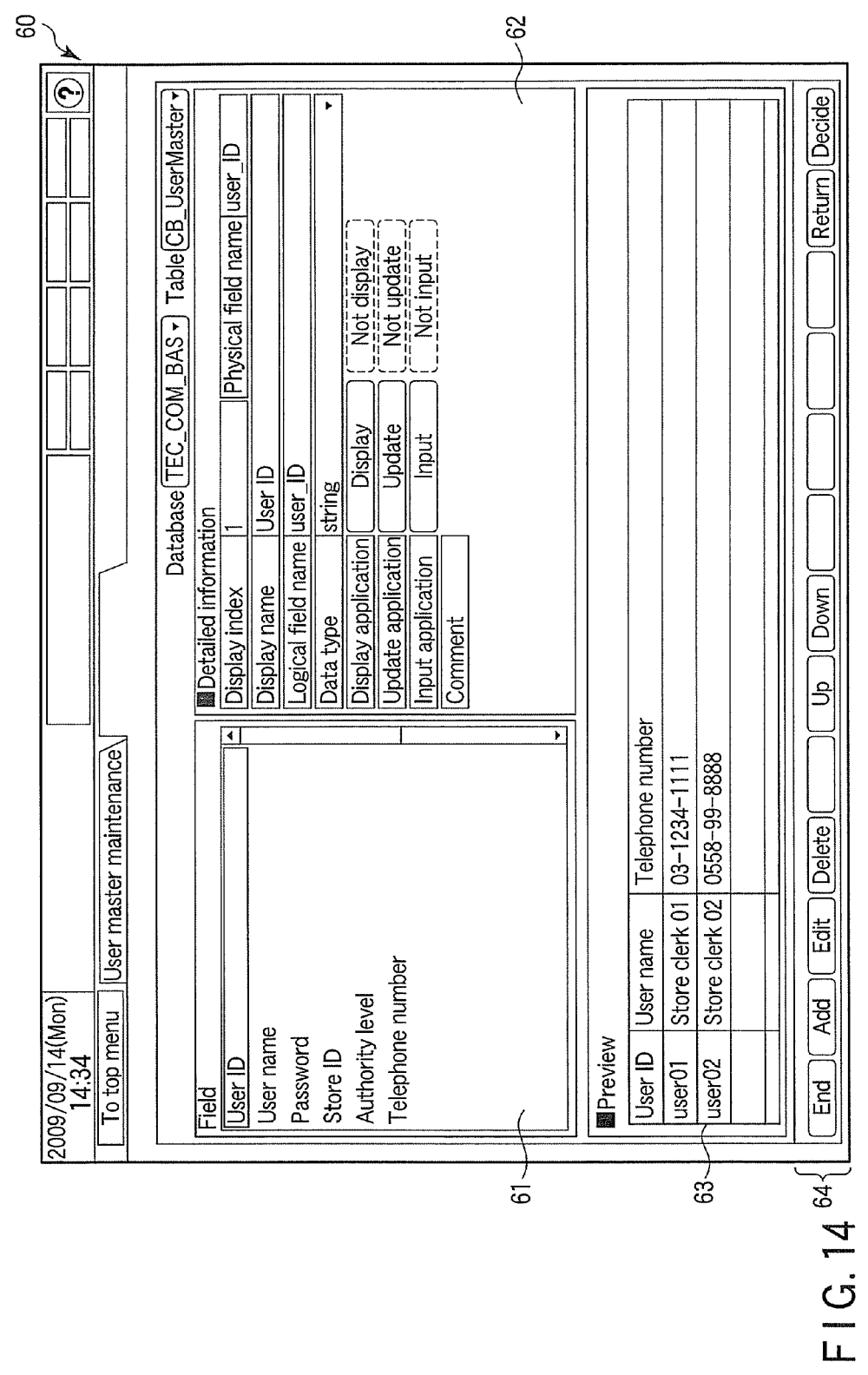

FIG. 14 is a diagram of an example of an image for editing 60.

The image for editing 60 includes areas 61, 62, and 63 and a button group 64.

In the area 61, a list of information described in the information field of the display name in the data records of the extracted attribute table is shown.

In the area 62, information described in a data record including a selected display name among the display names shown in the area 61 (hereinafter referred to as selected attribute record) is shown. Information described in the information fields of the display application, the update application, and the input application is a numerical value of 0 or 1. However, since the numerical value represents presence or absence of display, update, and input, the information described in the information fields is shown in a state shown in FIG. 14.

In the area 63, the information shown in the area 51 in the image for confirmation 50 is shown.

The button group 53 includes plural buttons. Kinds of processing that can be executed are respectively allocated to the plural buttons.

In Act Sc9, the CPU 35 waits for some operation to be performed by the operator in a state in which the image for editing 60 is displayed. If operation for requesting processing other than addition of a new data record is performed, the CPU 35 shifts to the processing requested by the operation. For example, if operation for requesting a change of the information shown in the area 62 is performed, the CPU 35 changes relevant information according to the operation. For example, if operation for changing information in the information field of the display name from "user ID" to "store clerk ID" is performed, the CPU 35 receives the operation and causes the storing unit 34 to store the information after the change as new information of the information field of the display name. If an area indicated as "not display" is clicked in the area 62, the CPU 35 causes the storing unit 34 to store the value 0 as new information of the information field of the display application. If such operation is performed, the CPU 35 updates the area 62 to reflect the editing. If a request for deciding the change is performed by, for example, operation of a decision button among the button group 53, the CPU 35 transmits update request information including the information stored in the storing unit 34 from the communication unit 31 to the server apparatus 2 via the communication network 4.

On the other hand, if addition of a new data record is requested by, for example, operation of an addition button among the button group 53, the CPU 35 proceeds from Act Sc9 to Act Sc10. In Act Sc10, the CPU 35 detects an information field not used by the change requesting company in the master table 11 (hereinafter referred to as unused field). Specifically, the unused field can be detected as an information field included in the extracted master table, a data record including information concerning the information field being not present in the extracted attribute table. When plural relevant information fields are present, the CPU 35 selects one of the information fields according to rules decided in advance and sets the selected information field as the unused field. Typically, the CPU 35 selects an information field equivalent to a column closer to the top. Specifically, for example, if the extracted master table and the extracted attribute table are as shown in FIGS. 7 and 8, the information fields of FFU3 to FFU5 are candidates of the unused field. However, the CPU 35 detects the information field of the FFU3 among the information fields as the unused field.

In Act Sc11, the CPU 35 generates an image for addition and causes the display device 33 to display the image for addition. The image for addition is an image for causing the operator to perform operation for setting of information described in a data record added to the extracted attribute table.

FIG. 15 is a diagram of an example of an image for addition 70.

The image for addition 70 includes areas 71, 72, and 73 and a button group 74.

In the areas 71, 72, and 73, kinds of information respectively substantially the same as those shown in the areas 61, 62, and 63 in the image for editing 60 are shown.

However, the CPU 35 adds and shows a name for identifying a new data record in the area 71. The name may be, for example, "new". However, in FIG. 15, a physical field name of the unused field is used.

The CPU 35 sets a data record concerning the unused field as the selected attribute record. However, the data record concerning the unused field is not present at this point. Therefore, the CPU 35 basically shows information of the fields as blanks in the area 72. However, since the physical field name of the unused field is set as the attribute information concerning the physical field name, the CPU 35 shows relevant information. It is highly likely that a value larger by one than a maximum among values described in the information field of the display index in the data records, the display application of which is 1, among the data records included in the extracted attribute table is set as the attribute information concerning the display index. Therefore, the CPU 35 may set such a value as an initial value and show the value in the area 72 as shown in FIG. 15. "Display" or "not display", "update" or "not update", and "input" or "not input" are always respectively set in the information fields of the display application, the update application, and the input application. Therefore, the CPU 35 may set, for example, "display", "update", and "input" as initial values and show the initial values in the area 72 as shown in FIG. 15.

The CPU 35 adds, in the area 73, a display space in which the name added and shown in the area 71 is set as a label.

The button group 74 includes plural buttons. Kinds of processing that can be executed are respectively allocated to the plural buttons.

In Act Sc12, the CPU 35 waits for operation for designating attribute information or operation for requesting decision to be performed by the operator in a state in which the image for addition 70 is displayed. If the operation for designating attribute information is performed, the CPU 35 proceeds from Act Sc12 to the Act Sc13. In Act Sc13, the CPU 35 acquires the attribute information designated by the operation by the operator. This method of acquiring attribute information may be arbitrary. More specifically, as the method of acquiring attribute information, for example, one or more of methods explained below can be adopted.

(1) Inputting, via the input device 32, attribute information designated by the user.

(2) Reading out, from the storing unit 34, information selected by the operator among kinds of candidate information stored in the storing unit 34 in advance.

(3) Readings out, from the storing unit 34, information selected by the operator among the kinds of information described in the extracted master table stored in the storing unit 34. In this case, the information included in the data records already described in the extracted master table is copied to a data record to be added.

(4) Capturing information selected by the operator among the kinds of information described in the master table 11 from the database 1 via the server apparatus 2. In this case, the information included in the data records already described in the master table 11 is copied to a data record to be added.

The CPU 35 causes the storing unit 34 to store the acquired information. When attribute information concerning the information field in which the initial values are set as explained above is designated by the operator anew, the CPU 35 sets the attribute information designated anew valid.

In Act Sc14, the CPU 35 updates the image for addition 70 to show the acquired attribute information and returns to Act Sc12.

FIG. 16 is a diagram of an example of the updated image for addition 70.

In a state of the image for addition 70 shown in FIG. 16, "cellular phone" is acquired as the attribute information concerning the display name, "MOBILE_NO" is acquired as the attribute information concerning the logical field name, "string" is acquired as the attribute information concerning the type and the kinds of attribute information of the display index, the display application, the update application, and the input application are not changed from the initial values explained above.

After acquiring the attribute information concerning the display name, the CPU 35 changes the name of the unused field in the area 71 to the attribute information concerning the display name. Further, the CPU 35 changes the label of the display space added anew to the attribute information concerning the display name.

If decision is requested by, for example, operation of the decision button among the button group 74 in the waiting state in Act Sc12, the CPU 35 proceeds from Act Sc12 to Act Sc15. In Act Sc15, the CPU 35 generates a data record in which the attribute information acquired concerning the information fields is described in association with the information fields.

In Act Sc13, the CPU 35 transmits addition request information including the generated data record from the communication unit 31 to the server apparatus 2 via the communication network 4.

In the server apparatus 2, after transmitting the response information in Act Se7, the CPU 24 waits for request information transmitted from the terminal apparatus 3 to arrive. If such request information arrives, in Act Se8, the CPU 24 causes the communication unit 22 to receive the response information and then acquires the response information from the communication unit 22.

In Act Se9, the CPU 35 checks whether the received request information is addition request information. If the received information is the addition request information, the CPU 35 proceeds from Act Se9 to Act Se10. In Act Se10, the CPU 35 updates the master attribute table 12 to include a data record included in the addition request information.

FIG. 17 is a diagram of an example of the master attribute table 12 after the update.

The master attribute table 12 after the update shown in FIG. 17 is obtained by updating the master attribute table 12 before the update in the state shown in FIG. 5 to add a data record in which the attribute information shown in the area 72 in FIG. 16 is described. A ninth data record from the top in FIG. 17 is the added data record.

In this way, an information field that a certain company does not use can be used by the company. For example, after the master attribute table 12 is updated as shown in FIG. 17, a company with the company code 001 can use the information field of FFU3 in the master table 11 in order to describe a cellular phone number as shown in FIG. 18.

Figure 20:
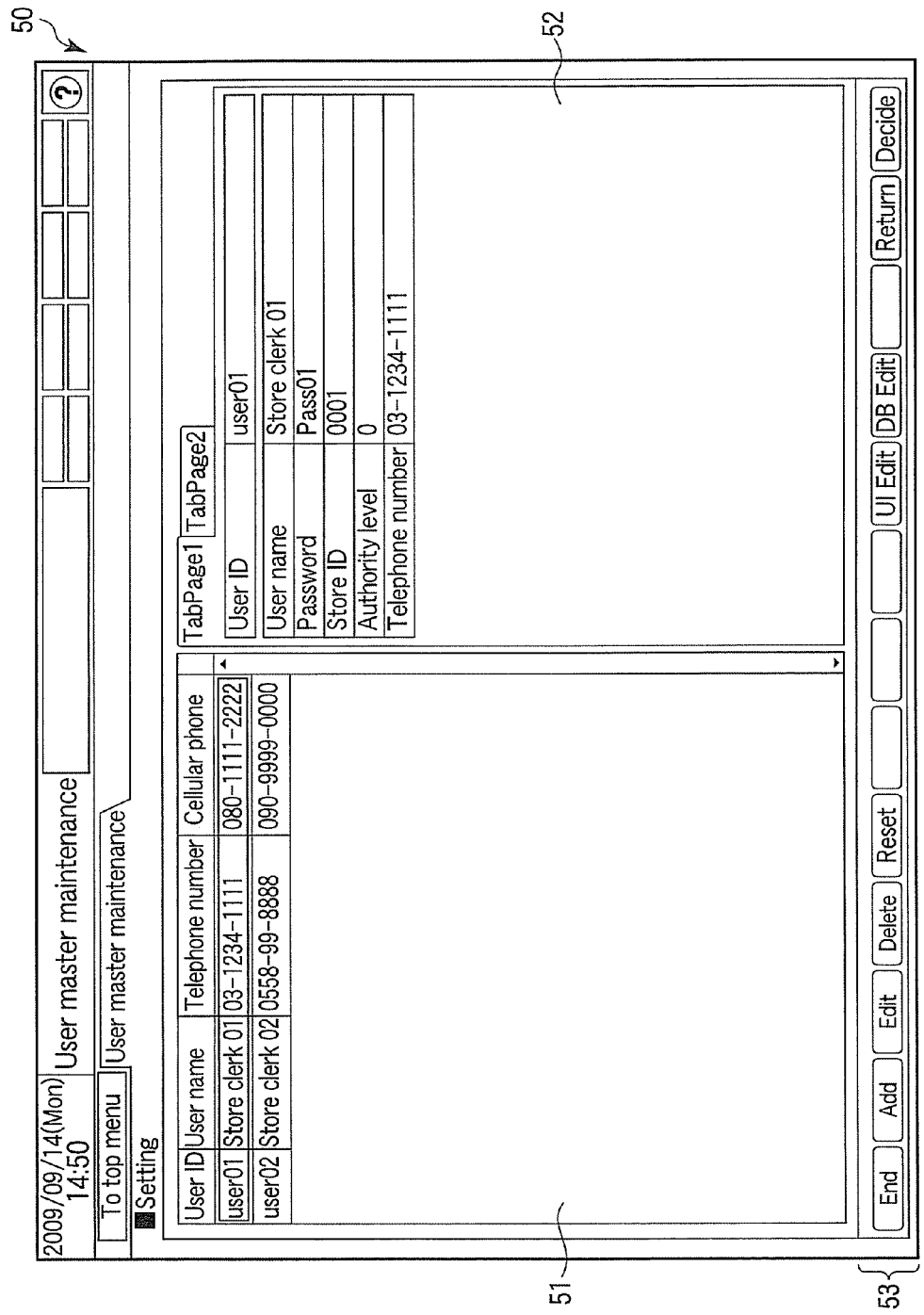
FIG. 20 is a diagram of an example of an image for confirmation based on the master attribute table and the master table respectively shown in FIG. 17 and FIG. 18.

After the master table 11 is updated as shown in FIG. 18, if the processing shown in FIG. 6 is executed, a display image shown in FIG. 19 is displayed on the display device 33. If the processing shown in FIGS. 11 and 12 is executed, the image for confirmation 50 shown in FIG. 20 is displayed on the display device 33.

Consequently, in the database system 100, the companies can arbitrarily update the master attribute table 12 and customize the master table 11 according to needs of the companies.

The CPU 35 performs information display in the area 52 of the image for confirmation 50 on the basis of display definition data described in a user interface (UI) definition file. As the UI definition file, a separate UI definition file is created for each of the terminal apparatuses 3 and stored in, for example, the storing unit 34 of the terminal apparatus 3. However, the UI definition file may be stored in the database 1 or another database and given to the terminal apparatus 3 via the server apparatus 2 or anther server apparatus. If the UI definition file is given from the server apparatus 2 to the terminal apparatus 3, a UI definition file for the access source company authenticated in Act Sb2 only has to be included in, for example, the response information exchanged in Act Sb7 and Act Sc3. If the UI definition file is given from a server apparatus different from the server apparatus 2 to the terminal apparatus 3, after the access source company is authenticated in the same manner as Act Sb2 in the server apparatus, the UI definition file for the access source company only has to be given from the server apparatus to the terminal apparatus 3. Besides the display definition data, the UI definition file could include other information such as event registration information for designating an external library in which event processing caused according to operation on a screen is implemented. As the UI definition file, for example, a layout definition file of Microsoft Corporation can be used.

The display definition data included in the UI definition file defines a display form of the information included in the master table 11 independently of a display form depending on the display attributes described in the data records stored in the master attribute table 12. Therefore, when the master attribute table 12 is updated as explained above, the update is not reflected on the UI definition file. As a result, for example, as shown in FIG. 20, information concerning an information field set to be used anew is displayed in the area 51 but is not displayed in the area 52.

When the operator desires to display the information concerning the information field set to be used anew in the area 52 as well, the operator requests editing of the UI definition file by, for example, operating a UI editing button in the button group 53 in a state in which the image for confirmation 50 is displayed.

Figure 21:
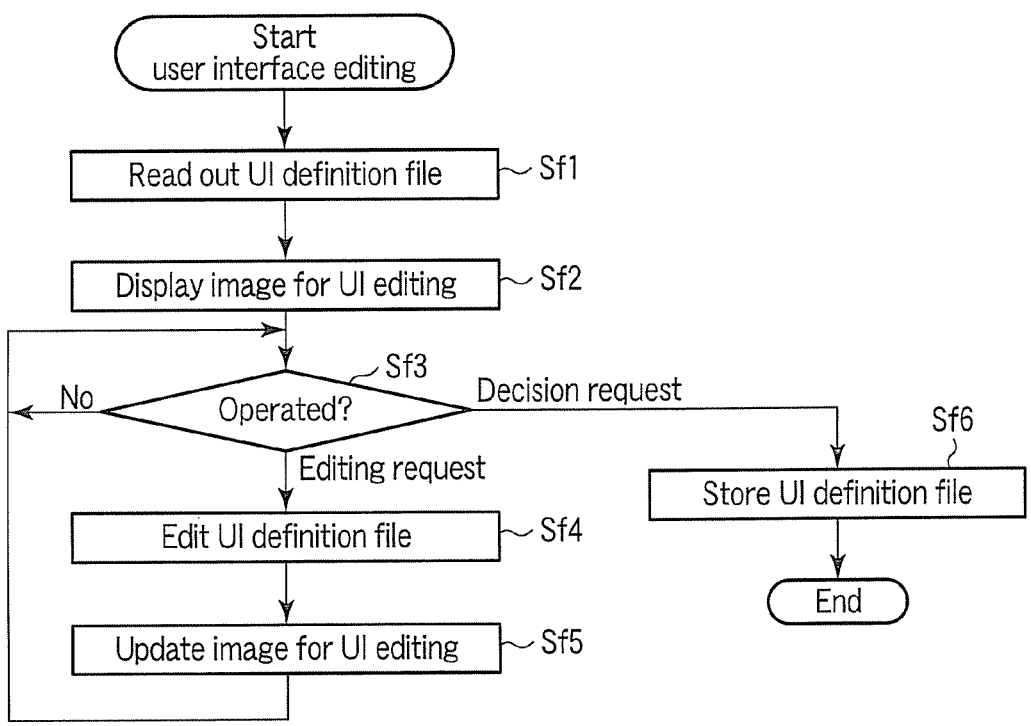
FIG. 21 is a flowchart for explaining UI editing of the CPU shown in FIG. 3.

If the editing of the UI definition file is requested in this way, the CPU 35 shifts from Act Sc7 to UI editing shown in FIG. 21.

In Act Sf1, the CPU 35 reads out the UI definition file from the storing unit 34.

In Act Sf2, the CPU 35 generates an image for editing and causes the display device 33 to display the image for editing. The image for editing is an image for editing display definition data in the UI definition file.

FIG. 22 is a diagram of an example of an image for editing 80.

The image for editing 80 includes areas 81, 82, and 83 and button groups 84 and 85.

In the area 81, editing target information as a part of information included in the display definition data is shown. In the area 81, a character string representing a label displayed in the area 52 of the image for confirmation 50 and a character string for specifying a physical field in which information displayed in association with the label is described are shown. In FIG. 22, a part of the information for displaying an image shown in the area 52 in FIG. 20 is shown.

In the area 82, a list of components that can be arranged in the area 52 is shown. The area 82 is also used by the operator to select these components.

In the area 83, detailed attribute information such as a display position is shown.

Each of the button groups 84 and 85 includes plural buttons. Kinds of processing that can be executed are respectively allocated to the plural buttons.

In Act Sf3, the CPU 35 waits for operation for editing displayed information or operation for requesting decision to be performed by the operator in a state in which the image for editing 80 is displayed. If the operation for editing is performed, the CPU 35 proceeds from Act Sf3 to Act Sf4. In Act Sf4, the CPU 35 edits a UI definition file according to the operation by the operator.

Specifically, if the operator inputs a character string "cellular phone" as a new label and inputs a character string "{Binding FFU1, Mode=TwoWay}" concerning the label, the CPU 35 edits a UI definition file to include description of a specified format including the character strings. The UI definition file to be edited is the UI definition file read out in Act Sf1 and copied to an internal memory of the CPU 35 or the storing unit 34.

In Act Sf5, the CPU 35 updates the image for editing to reflect the editing of the UI definition file and returns to Act Sf3.

Figure 23:
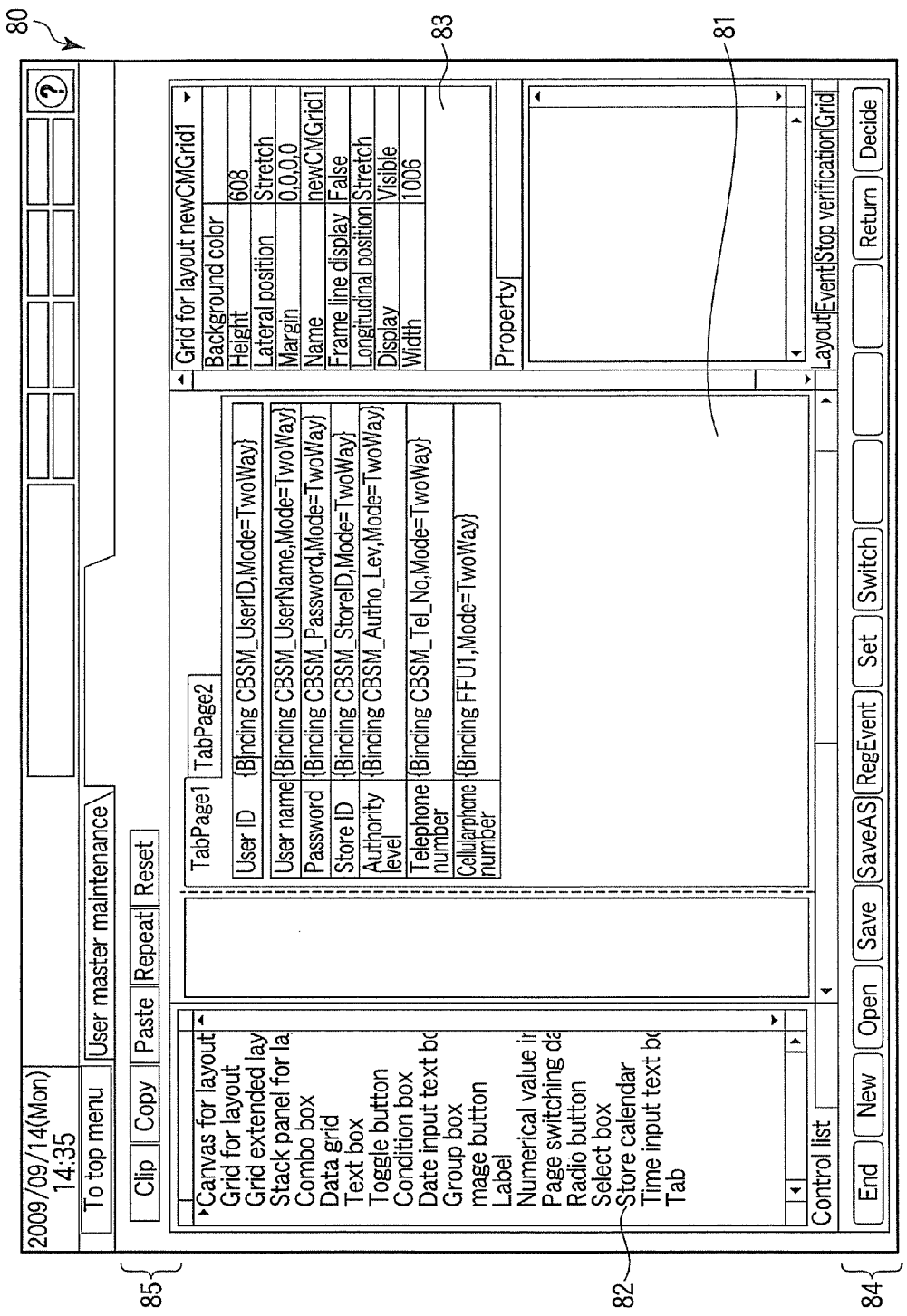
FIG. 23 is a diagram of an example of the updated image for editing.

FIG. 23 is a diagram of an example of the updated image for editing 80.

If decision is requested by, for example, operation of a decision button among the button group 84 in the waiting state in Act Sf3, the CPU 35 proceeds from Act Sf3 to Act Sf6. In Act Sf6, the CPU 35 stores the UI definition file edited as explained above in the storing unit 34 as a regular UI definition file.

After the UI definition file is updated in this way, if the processing shown in FIGS. 11 and 12 is executed, for example, the image for confirmation 50 shown in FIG. 24 is displayed in the display device 33.

In this way, in the image for confirmation 50, the information included in the master table 11 is represented in each of a display form based on the display attributes described in the master attribute table 12 and a display form defined in the UI editing file. Therefore, the operator can confirm, with the image for confirmation, while confirming what kind of information the information included in the master table 11 but not displayed in the display images shown in FIGS. 9 and 10 is, how the information is displayed in the display image. Various modifications of this embodiment are possible as explained below.

The master table 11 and the master attribute table 12 may be stored in separate databases.

Only one terminal apparatus 3 may be provided.

The server apparatus 2 may generate a display image and transmit the display image to the terminal apparatus 3 and the terminal apparatus 3 may display the display image.

A computer apparatus having the functions of the server apparatus 2 excluding the communication function with the terminal apparatus 3 and the functions of the terminal apparatus 3 excluding the communication function with the server apparatus 2 may be connected to the database 1 to configure a database system. In other words, the computer apparatus connected to the database 1 may perform identification of a user, readout of data records associated with the user from the master table 11 and the master attribute table 12, and generation of a display image based on the read-out data records.

All the information fields of the master table 11 may be used as information fields in which individual information can be described.

The server apparatus 2 may perform detection of an unused field and transmit information indicating a result of the detection to the terminal apparatus 3.

The terminal apparatus 3 may perform identification of a company as a target of detection of an unused field.

The database system 100 that causes plural users to share one database 1 is explained above. However, the database system 100 may cause only a single user to use the set of master table 11 and master attribute table 12. In this case, the information field of the company code, i.e., the information field of the identification information of the user can be omitted from the master table 11 and the master attribute table 12. The server apparatus 2 transmits, in response to a request from the terminal apparatus 3, response information including the entire master table 11 and master attribute table 12 to the terminal apparatus 3. In the database system modified in this way, it is necessary to prepare the database 1 for each of the users. However, as a computer program for causing the computer apparatus to function as the terminal apparatus 3, all the users can use the same computer program. In other words, it is unnecessary to develop the computer program individually for each of the users. As a result, labor and time for the development of the computer program is reduced and the price of the computer program can be reduced.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A database system comprising:
   a first storing unit configured to store on a computer readable storage medium a first data table that describes plural first data records respectively including information concerning plural information fields;
   a second storing unit configured to store a second data table that describes second data records each including plural kinds of attribute information respectively representing display attributes concerning the information fields included in the first data records;
   a third storing unit configured to store, concerning the information stored in the first storing unit, display definition data that describes plural kinds of attribute information respectively representing display attributes set independently of the display attributes represented by the attribute information included in the second data records;
   an image generating unit configured to generate a display image simultaneously representing a first image for displaying the information included in the first data records according to the display attributes represented by the attribute information included in the second data records and a second image for displaying the information included in the first data records according to the display attributes represented by the attribute information described in the display definition data;
   a server apparatus accessible to the first and second storing units; and
   a terminal apparatus capable of communicating with the server apparatus and accessible to the third storing unit, wherein
   the server apparatus includes:
      a first readout unit configured to read out at least a part of the first data records and at least a part of the second data records from the first and second storing units;
      a first communication unit configured to communicate with the terminal apparatus; and
      a transmission control unit configured to control the first communication unit to transmit the first and second data records read out by the readout unit to the terminal apparatus,
   the terminal apparatus includes, besides the image generating unit,
      a second communication unit configured to communicate with the server apparatus;
      a reception control unit configured to control the second communication unit to receive the first and second data records transmitted by the first communication unit; and
      a second readout unit configured to read out the display definition data from the third storing unit, and
   the image generating unit generates the first image as an image for displaying information included in the first data records received by the second communication unit according to display attributes represented by attribute information included in the second data records received by the second communication unit and generates the second image as an image for displaying the information included in the first data records received by the second communication unit according to display attributes represented by attribute information described in the display definition data read out by the second readout unit, wherein
   the first data table describes each of the first data records in association with anyone of plural users,
   the second data table describes each of the second data records in association with the user,
   the third storing unit stores display definition data included in the terminal apparatus and set in relation to the terminal apparatus,
   the server apparatus further includes:
      an identifying unit configured to identify a user who uses the terminal apparatus;
      a unit configured to extract first data records associated with the user identified by the identifying unit among the plural first data records and generate a third data table as a set of the extracted first data records; and
      a unit configured to extract second data records associated with the user identified by the identifying unit among the plural second data records and generate a fourth data table as a set of the extracted second data records,
   the transmission control unit controls the first communication unit to transmit the third data table and the fourth data table to the terminal apparatus,
   the reception control unit controls the second communication unit to receive the third data table and the fourth data table, and
   the image generating unit generates the first image as an image for displaying information included in the third data table according to display attributes represented by attribute information included in the fourth data table and generates the second image as an image for displaying the information included in the third data records according to the display definition data stored in the third storing unit.

2. The system according to claim 1, wherein
the first data table describes each of the first data records in association with anyone of plural users,
the second data table describes each of the second data records in association with the user,
the display definition data is set in relation to anyone of the plural users, and
the image generating unit generates the first image as an image for displaying, according to display attributes represented by attribute information included in the second data records associated with the user related to the display definition data, information included in the first data records associated with a user related to the display definition data.

3. The system according to claim 1, further comprising:
an input unit configured to input an instruction of a user involved in a change of the display definition data; and
a changing unit configured to change the display definition data stored in the third storing unit according to the instruction input by the input unit.

4. The system according to claim 3, further comprising:
a detecting unit configured to detect an information field not in use among the information fields included in the first data table;
an acquiring unit configured to acquire attribute information concerning the information field detected by the detecting unit according to an instruction of the user;
a record generating unit configured to generate a data record including the attribute information acquired by the acquiring unit and identification information of the information field detected by the detecting unit; and
an updating unit configured to update the second data table to include the data record generated by the record generating unit as a second data record related to a user identified by an identifying unit.

5. A terminal apparatus included in a database system, the database system comprising
a first storing unit configured to store to a computer readable storage medium a first data table that describes plural first data records respectively including information concerning plural information fields,
a second storing unit configured to store a second data table that describes second data records each including plural kinds of attribute information respectively representing attributes concerning the information fields included in the first data records,
a third storing unit configured to store, concerning the information stored in the first storing unit, display definition data that describes plural kinds of attribute information respectively representing display attributes set independently of the display attributes represented by the attribute information included in the second data records,
a server apparatus accessible to each of the first and second storing units,
a server apparatus accessible to the first and second storing units; and
a terminal apparatus capable of communicating with the server apparatus and accessible to the third storing unit, wherein
the server apparatus includes:
a first readout unit configured to read out at least a part of the first data records and at least a part of the second data records from the first and second storing units;
a first communication unit configured to communicate with the terminal apparatus; and
a transmission control unit configured to control the first communication unit to transmit the first and second data records read out by the readout unit to the terminal apparatus,
the terminal apparatus includes, besides the image generating unit,
a second communication unit configured to communicate with the server apparatus;
a reception control unit configured to control the second communication unit to receive the first and second data records transmitted by the first communication unit; and
a second readout unit configured to read out the display definition data from the third storing unit, and
the image generating unit generates the first image as an image for displaying information included in the first data records received by the second communication unit according to display attributes represented by attribute information included in the second data records received by the second communication unit and generates the second image as an image for displaying the information included in the first data records received by the second communication unit according to display attributes represented by attribute information described in the display definition data read out by the second readout unit, wherein
the first data table describes each of the first data records in association with anyone of plural users,
the second data table describes each of the second data records in association with the user,
the third storing unit stores display definition data included in the terminal apparatus and set in relation to the terminal apparatus,
the server apparatus further includes:
an identifying unit configured to identify a user who uses the terminal apparatus;
a unit configured to extract first data records associated with the user identified by the identifying unit among the plural first data records and generate a third data table as a set of the extracted first data records; and
a unit configured to extract second data records associated with the user identified by the identifying unit among the plural second data records and generate a fourth data table as a set of the extracted second data records,
the transmission control unit controls the first communication unit to transmit the third data table and the fourth data table to the terminal apparatus,
the reception control unit controls the second communication unit to receive the third data table and the fourth data table, and
the image generating unit generates the first image as an image for displaying information included in the third data table according to display attributes represented by attribute information included in the fourth data table and generates the second image as an image for displaying the information included in the third data records according to the display definition data stored in the third storing unit,
the terminal apparatus comprising:
a communication unit configured to communicate with the server apparatus;
a reception control unit configured to control the communication unit to receive the first and second data records transmitted by the server apparatus;

a readout unit configured to read out the display definition data from the third storing unit; and an image generating unit configured to generate a display image simultaneously representing a first image for displaying information included in the first data records received by the communication unit according to display attributes represented by attribute information included in the second data records received by the communication unit and a second image for displaying the information included in the first data records received by the communication unit according to display attributes represented by attribute information described in the display definition data.

6. The terminal apparatus according to claim 5, wherein
the first data table describes each of the first data records in association with anyone of plural users,
the second data table describes each of the second data records in association with the user,
the server apparatus further identifies a user who uses the terminal apparatus, extracts first data records associated with the user identified by the identifying unit among the plural first data records and generates a third data table as a set of the extracted first data records, extracts second data records associated with the user identified by the identifying unit among the plural second data records and generates a fourth data table as a set of the extracted second data records, and transmits the third table and the fourth table to the terminal apparatus,
the terminal apparatus further comprises the third storing unit having stored therein the display definition data set in relation to the terminal apparatus,
the reception control unit controls the communication unit to receive the third data table and the fourth data table, and
the image generating unit generates the first image as an image for displaying information included in the third data table according to display attributes represented by attribute information included in the fourth data table and generates the second image as an image for displaying the information included in the third data table according to the display definition data stored in the third storing unit.

7. The terminal apparatus according to claim 5, further comprising:
an input unit configured to input an instruction of a user involved in a change of the display definition data; and
a changing unit configured to change the display definition data stored in the third storing unit according to the instruction input by the input unit.

8. A method of generating a display image for confirming a setting in a database system including:
a first storing unit configured to store a first data table that describes plural first data records respectively including information concerning plural information fields;
a second storing unit configured to store a second data table that describes second data records each including plural kinds of attribute information respectively representing display attributes concerning the information fields included in the first data records;
a third storing unit configured to store, concerning the information stored in the first storing unit, display definition data that describes plural kinds of attribute information respectively representing display attributes set independently of the display attributes represented by the attribute information included in the second data records, a server apparatus accessible to the first and second storing units; and
a terminal apparatus capable of communicating with the server apparatus and accessible to the third storing unit, wherein
the server apparatus includes:
a first readout unit configured to read out at least a part of the first data records and at least a part of the second data records from the first and second storing units;
a first communication unit configured to communicate with the terminal apparatus; and
a transmission control unit configured to control the first communication unit to transmit the first and second data records read out by the readout unit to the terminal apparatus,
the terminal apparatus includes, besides the image generating unit,
a second communication unit configured to communicate with the server apparatus;
a reception control unit configured to control the second communication unit to receive the first and second data records transmitted by the first communication unit; and
a second readout unit configured to read out the display definition data from the third storing unit, and
the image generating unit generates the first image as an image for displaying information included in the first data records received by the second communication unit according to display attributes represented by attribute information included in the second data records received by the second communication unit and generates the second image as an image for displaying the information included in the first data records received by the second communication unit according to display attributes represented by attribute information described in the display definition data read out by the second readout unit, wherein
the first data table describes each of the first data records in association with anyone of plural users,
the second data table describes each of the second data records in association with the user,
the third storing unit stores display definition data included in the terminal apparatus and set in relation to the terminal apparatus,
the server apparatus further includes:
an identifying unit configured to identify a user who uses the terminal apparatus;
a unit configured to extract first data records associated with the user identified by the identifying unit among the plural first data records and generate a third data table as a set of the extracted first data records; and
a unit configured to extract second data records associated with the user identified by the identifying unit among the plural second data records and generate a fourth data table as a set of the extracted second data records,
the transmission control unit controls the first communication unit to transmit the third data table and the fourth data table to the terminal apparatus,
the reception control unit controls the second communication unit to receive the third data table and the fourth data table, and
the image generating unit generates the first image as an image for displaying information included in the third data table according to display attributes represented by attribute information included in the fourth data table and generates the second image as an image for displaying the information included in the third data records according to the display definition data stored in the third storing unit, the method comprising:
  generating a first image for displaying the information included in the first data records according to the display attributes represented by the attribute information included in the second data records;
  generating a second image for displaying the information included in the first data records according to the display attributes represented by the attribute information described in the display definition data; and
  generating the display image as an image simultaneously representing the first image and the second image.

\* \* \* \* \*